United States Patent [19]

Sommarlund

[11] 4,220,615

[45] Sep. 2, 1980

[54] METHOD FOR THE MANUFACTURE OF A POWER CABLE

[75] Inventor: Stanley Sommarlund, Huddinge, Sweden

[73] Assignee: Asea, Vasteras, Sweden

[21] Appl. No.: 967,021

[22] Filed: Dec. 6, 1978

[30] Foreign Application Priority Data

Dec. 9, 1977 [SE] Sweden ............................ 7713997

[51] Int. Cl.[2] ............................................ B29F 3/10

[52] U.S. Cl. ............................ 264/174; 174/106 SC; 174/120 SC; 264/236; 264/347; 425/113

[58] Field of Search ...................... 264/174, 236, 347; 174/120 SC, 106 SC; 425/113

[56] References Cited

U.S. PATENT DOCUMENTS

| | | | |
|---|---|---|---|
| 3,749,817 | 7/1973 | Shiga et al. | 174/120 SC |
| 3,901,633 | 8/1975 | Chrisman et al. | 425/113 |
| 3,909,177 | 9/1975 | Takaoka et al. | 425/113 |
| 4,107,245 | 8/1978 | Jansson | 264/174 |

*Primary Examiner*—Jeffery R. Thurlow

*Attorney, Agent, or Firm*—Watson, Cole, Grindle & Watson

[57] ABSTRACT

A method for manufacturing a power cable wherein an inner polymeric electrically-conducting layer is extruded into surrounding relationship with respect to a conductor core element, an initially thermoplastic, heat cross-linkable polymeric layer of insulation is then extruded into surrounding relationship with respect to the conducting layer, and thereafter cross-linking is caused to occur in the layer of insulation by heating the same under pressure. The conductor element with the applied inner conducting layer is heated prior to the extrusion thereon of the insulation layer to increase the rate of production of the cable. To facilitate this heating operation, the material used for the inner polymeric conducting layer is characterized by sufficient resistance to indentation at the extrusion temperature of the insulation layer to prevent the inner electrically-conducting layer from being deformed or damaged during the extrusion thereon of the insulation layer. An outer electrically-conducting layer is applied on the insulation layer and a protective and insulating sheet of polymeric material is applied to the outer conducting layer.

6 Claims, 2 Drawing Figures

METHOD FOR THE MANUFACTURE OF A POWER CABLE

BACKGROUND OF THE INVENTION

1. Field of the Invention

The present invention relates to the production of power cables and particularly to the production of such articles utilizing extrusion techniques for application of both conducting and insulating layers.

2. Description of the Prior Art

Electrical power cables normally comprise a core conductor element, an inner electrically-conducting semiconductive layer disposed around the conductor in electrical contact therewith and an insulation layer disposed around the conducting layer. A surrounding, outer, electrically-conducting semiconductive layer is applied to the insulation layer and a protective and insulating sheath of polymeric material disposed about the outer semiconductive layer. A metal shield is often applied between the insulation layer and the sheath.

The inner and outer conducting layers each generally consist of an extruded layer of a polymeric material containing a conducting constituent such as carbon black, while the insulation layer typically consists of an extruded layer of a polymeric material such as a cross-linked polyethylene. Conventionally, the inner conducting layer was extruded onto the cable conductor core element at a first extrusion station and the insulation layer was then extruded onto the inner conducting layer at a second extrusion station. The composite article comprising the conductor element, the applied inner conducting layer and the applied insulation layer then were subjected to heating under pressure, usually by application of steam, so that the polymeric material in the insulation layer would undergo cross-linking and present a blister free layer. Thus, the heating of the composite article layer has previously generally been accomplished from the outside and inwardly in the direction of the conductor core element. Such heating has conventionally been continued until the polymeric material was sufficiently heated throughout its cross-sectional area to cause the entirety of the polymeric material in the insulation layer to become cross-linked.

The foregoing heating step has essentially been the critical factor in determining the speed at which the cable could be manufactured because it was necessary to make sure that the inner conducting layer did not become damaged. In this connection, it has been thought to be necessary for the conductor to be substantially at room temperature when it entered the second extrusion station because this protected the inner conducting layer against undue heating from the polymeric material being applied thereto to form the insulation layer. This relatively cooler inner conducting layer was able to resist being pressed into gaps between the wires of the cable conductor core or otherwise deformed or damaged. It was also known from these prior techniques that the insulation would become cross-linked at its outer portions at an early stage and this operated to reduce the risk of damage to the inner conducting layer so long as the same was maintained at a relatively low temperature. In such case the shell of cross-linked material thus formed served to reduce the pressure on the inner conducting layer.

SUMMARY OF THE INVENTION

In accordance with the present invention such protection of the inner conducting layer is not required and as a result it has now been found to be possible to considerable increase the rate of production of the cable conductor. This is accomplished through the use of a material for the inner conducting layer which possesses great resistance to indentation, even when subjected to the temperatures of the polymeric material that is applied thereon to form the insulation layer and by heating the conductor core element and the applied inner conducting layer before the introduction thereof into the second extrusion station for application of the insulation layer.

In accordance with this improved method, a polymeric electrically-conducting layer is extruded into surrounding relationship with respect to a conductor core element. Then an initially thermoplastic, heat cross-linkable, polymeric layer of insulation is extruded at a predetermined temperature into surrounding relationship with respect to the conducting layer. Cross-linking is caused to occur in the layer of insulation by heating under pressure. The material used to form the polymeric electrically-conducting layer is characterized by sufficient resistance to indentation at such predetermined extrusion temperature to prevent the same from being deformed or damaged during the extrusion application of the insulation layer. The foregoing facilitates the heating of the cable core element and the applied conducting layer prior to the extrusion of the insulation layer onto the conducting layer whereby the production rate of the cable may be increased.

The material utilized as the polymeric electrically-conducting layer is preferably characterized by a melting range of 20° C. or less, whereby the same has substantially unchanged properties with increasing temperature up to its melting temperature. More particularly, the material utilized as the polymeric electrically conducting layer is characterized by sufficient resistance to indentation that the same will receive an indentation which amounts to no more than 10 percent of the original thickness of a test specimen of the material formed by compression-moulding at 175° C. and having a thickness of 1.50 mm and a diameter of 15.0 mm when such specimen is subjected to loading with a pressure of 13 $kp/cm^2$ for five minutes at a temperature of 125° C. and the indentation is then measured after the specimen with the remaining load has been allowed to cool for one hour at room temperature. Specifically, the preferred material comprises a graft copolymer of high density polyethylene and butyl rubber wherein the amount of butyl rubber is 20 to 60 percent by weight of the graft copolymer.

DETAILED DESCRIPTION OF THE INVENTION

Figure 1:
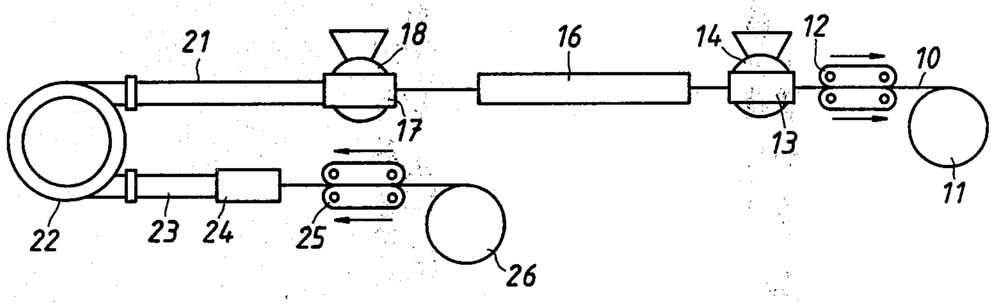
FIG. 1 is a schematic of a device useful for practicing the process of the present invention.
Figure 2:
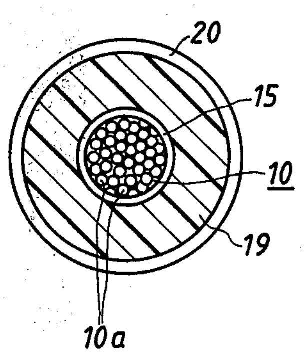
FIG. 2 is a cross-sectional view of a cable conductor produced by the method of the invention.

With reference to the drawings, the present invention relates to a method for the manufacture of a power cable wherein a conductor core element 10 is enveloped or surrounded by an inner conducting layer 15 formed by extrusion of a polymeric material containing conducting constituents at a first extrusion station 14. Thereafter an insulation layer 19 is applied by extrusion of a polymeric material at a second extrusion station 18. Cross-linking of the insulative polymeric material of layer 19 is caused to occur by heating under pressure in heater 21.

In accordance with the invention, a highly preferred material to be used for forming layer 15 is characterized by sufficient resistance to indentation that the same will receive an indentation which amounts to no more than 10 percent of the original thickness of a test specimen of the material formed by compression-moulding at 175° C. and having a thickness of 1.50 mm and a diameter of 15.0 mm when such specimen is subjected to loading with a pressure of 13 kp/cm$^2$ for 5 minutes at a temperature of 125° C. and the indentation is then measured after the test specimen with the remaining load has been allowed to cool for one hour at room temperature. The above-mentioned heat-pressure test may preferably be carried out in accordance with IEC 92-3 (1965), Appendix G with the following deviations:

(a) the test temperature is 125° C.;

(b) the weight for effecting the loading pressure is 1 kg;

(c) the loading time at the test temperature is 5 minutes; and (d) the material tested is other than PVC.

The foregoing conducting material is characterized by great resistance to indentation which provides a reduced risk of mechanical damage to the conducting layer when the conductor core element with its applied layer 15 is passed through the second extrusion station 18. This is especially true if the conductor element is not round, such as, for example, a sector-shaped conductor, in which case damage may easily occur. If damage to the inner conductive layer occurs during the extrusion process or when the conductive layer is subjected to the temperatures and pressures required for cross-linking the polymeric material of the insulation layer, it is difficult to achieve the smooth surface necessary for avoiding locally high field strengths, or in the worst case, breakthrough in the layer.

The polymeric material for inner conducting layer 15 preferably is characterized by having a narrow melting range in the order of 20° C. or less so that the properties of the polymeric material will remain substantially unchanged up to its melting temperature. The polymeric material used in the conducting layer should also have the ability to take up sufficiently large quantities of conducting fillers to render the resultant material electrically conductive. A suitable polymeric material useful as the inner conducting layer is a high density polyethylene onto which butyl rubber has been grafted to form a graft copolymer. Generally in such graft copolymer the amount of butyl rubber should be about 20–60 percent by weight and in particular the amount of butyl rubber should be about 20–30 percent by weight. The foregoing graft copolymers are thermoplastic and are especially suited for use in connection with the present invention. The preferred conducting material for use in the inner conducting layer is conductive carbon black and the amount thereof suitably should be about 5–70 parts by weight and preferably should be about 10–50 parts by weight per 100 parts by weight of polymeric material.

The insulation layer 19 is applied by extrusion at an extrusion station 18. Prior to such application the conductor element 10 with layer 15 thereon is preferably heated to a temperature which is lower than the temperature to which the polymeric material for the insulation layer is heated in extrusion station 18 but which is within 75° C. of such temperature. Polymeric materials suitable for use in forming insulation layer 19 include polyethylenes, copolymerisates of ethylene and propylene, copolymerisates of ethylene or propylene or of ethylene and propylene with diene monomers such as 1,4-pentadiene, 1,4-hexadiene, 5-alkenyl-2-norbornene, 2,5-norbornadiene, 1,5-cyclooctadiene or dicyclopendadiene and which have double links from the diene monomer molecules remaining after the polymerisation, and ethylenepropylene terpolymers. Catalysts useful for causing the crosslinking of the foregoing copolymerisates include peroxides such as di-α-cumyl peroxide, di-t-butyl peroxide and di-(t-butylperoxy-isopropyl)-benzene. The amount of such catalyst to be included in the copolymerisate suitably is 0.1 to 5 parts by weight per 100 parts by weight of polymeric material. The temperature and time for the cross-linking reaction to occur will vary with the type of polymeric material, the type and amount of peroxide and the thickness of the insulation. In many applications, however, the temperature should be 150°–350° C. and the reaction time will be approximately 1–30 minutes. The polymeric material for layer 19 conventionally may also contain fillers such as chalk, plasticizers such as mineral oil, activators for the peroxides such as triallyl cyanurate and lead oxide, anti-oxidants such as polymerized timethyl dihydroquinoline, flame retardants such as antimony trioxide, and other conventional additives in conventional amounts.

Normally, an outer conducting layer 20 may be applied on insulation layer 19. This layer 20 may be of a conventional kind and may be applied either in connection with the application of the insulation layer and before the latter is cross-linked, or in a separate process on the already cross-linked insulation layer. The polymeric material in the outer conducting layer 20 is often made up of copolymers of polyethylene such as, for example, copolymers of ethylene and vinyl acetate. The conducting constituent in this layer usually consists of a conducting carbon black.

With reference to the drawing, a round conductor element 10 consisting of 61 stranded aluminium wires 10*a* each having a diameter of 2.34 mm is rolled off a drum 11 by means of the roll-off device 12 in the form of two endless transport belts. Conductor element 10 is then passed through the cross head 13 of extruder 14 where the element 10 is surrounded by a conducting layer 15 about 0.5 mm thick. The material forming the layer 15 preferably consists of a graft copolymer of high density polyethylene and butyl rubber in which the butyl rubber consists of 25 percent of the weight of the graft copolymer (for example, ET Polymer H 3100 from Allied Chemical, USA). The material for layer 15 contains conductive carbon black (for example, Ketchen-black EC from Ketjen Carbon NV, Holland) in the amount of 15 parts by weight per 100 parts by weight of polymeric material. The described polymeric material melts at a temperature of around 133° C. and its properties remain substantially unchanged up to this melting point. Such conducting material is heated in extruder 14 to an extrusion temperature of about 200° C.

Conductor element 10 with conducting layer 15 thereon is then passed through an infrared heating device 16 where it is heated to a temperature of about 115° C. The heated composite of element 10 and layer 15 then is passed through the cross head 17 of extruder 18 where an insulation layer 19 5.5 mm thick is applied. Cross head 17 may also be connected to another extruder (now shown) by which an outer conducting layer 20 0.5 to 1 mm thick may be applied to the outside of insulation layer 19. The polymeric material for insulation layer 19 in this preferred mode consists of a low density polyethylene having a melt index of about 2.2 containing about 2 parts by weight of di-$\alpha$-cumyl peroxide and 0.2 parts by weight of 4,4′-thiobis(6-t-butyl-m-cresol) as an anti-oxidant for each 100 parts by weight of polyethylene. The temperature of the polymeric material which is to form layer 19 while the same is in extruder 18 is about 125° C.

The material for forming outer conducting layer 20 preferably consists of 70 parts by weight of an ethylene-vinyl acetate copolymer containing about 85 percent by weight ethylene and about 15 percent by weight vinyl acetate (such as, for example, Lupolen V 3510 K from BASF, Germany), 35 parts by weight of conductive carbon black (such as Vulcan XC-72 from Cabot Carbon Ltd., England) and 2.5 parts by weight di-t-butyl peroxide. The temperature of the material for layer 20 while the same is in the extruder is about 120° C.

The material of insulation layer 19 and the material of the outer conducting layer 20 are caused to undergo crosslinking by heating the composite article comprising element 10 and layers 15, 19 and 20 in heating tube 21 in a steam atmosphere at a temperature of 220° C. and a corresponding pressure of about 25 atm. The heating time of the article during passage through tube 21 is approximately 5–10 minutes. Upon leaving steam tube 21 the conductor element 10 with its insulation and conducting layers 15, 19 and 20 is passed via a turning wheel 22 through a cooling tube 23 where the same is pressure-cooled by water at room temperature. The composite article then passes, in successsive order, a water-seal 24 and a roll-off device 25 in the form of two endless transport belts and then it is coiled up on the drum 26. Roll-off devices 12 and 25 cooperate so that the conductor cable is stretched during the process. The cable thus manufactured may be provided, in a conventional manner, and possibly after being connected with other cable parts, with a screen of metal and a sheath of polymeric material.

It is also possible, in accordance with the invention, to position heating device 16 ahead of extruder 14 or to leave heating device 16 as shown in FIG. 1 and provide a further heating device located ahead of extruder 14. Outer conducting layer 20 does not necessarily need to be applied at the same cross head on extruder 18 as insulation layer 19. Thus, layer 20 may be applied using a device employed separately for this purpose and after the polymeric material of insulation layer 19 has been cross-linked. And layer 20 may be applied by other than an extrusion process.

I claim:

1. In a method for manufacturing a power cable wherein a polymeric, electrically-conducting layer is extruded into surrounding relationship with respect to a cable conductor, an initially thermoplastic, heat cross-linkable, polymeric layer of insulation is extruded at a predetermined temperature into surrounding relationship with respect to the conducting layer, and thereafter cross-linking is caused to occur in said insulation layer by heating the composite under pressure, the improvement which comprises:

using for said polymeric, electrically-conducting layer a material characterized by sufficient resistance to indentation at said predetermined extrusion temperature to prevent the same from being deformed or damaged during the extrusion of said insulation layer and during said cross-linking operation, said material being sufficiently resistant to indentation that the same will receive an indentation which amounts to no more than 10 percent of the original thickness of a test specimen of said material, when formed by compression-moulding at 175° C. and when having a thickness of 1.50 mm and a diameter of 15.0 mm, and when such specimen is subjected to loading with a pressure of 13 kp/cm$^2$ for 5 minutes at a temperature of 125° C. and the indentation is then measured after the specimen with the remaining load has been allowed to cool for one hour at room temperature; and heating said cable to a temperature which is lower than said predetermined temperature but which is within 75° C. thereof prior to said extrusion of said insulation layer.

2. The method of claim 1 wherein said material is further characterized by a melting range of 20° C. or less.

3. The method of claim 1 wherein said material is further characterized by having substantially unchanged properties with increasing temperature up to its melting temperature.

4. The method of claim 1 wherein during said heating step said cable is heated to a temperature which is about 10° C. below said predetermined temperature.

5. A method as set forth in claim 1 wherein said material comprises a graft copolymer of a high density polyethylene and butyl rubber wherein the amount of butyl rubber is 20 to 60 percent by weight of said graft copolymer.

6. A method as set forth in claim 5 wherein during said heating step said cable is heated to a temperature of about 115° C.

* * * * *